(12) United States Patent
Greenfield et al.

(10) Patent No.: US 7,707,152 B1
(45) Date of Patent: Apr. 27, 2010

(54) EXPOSING RICH INTERNET APPLICATION CONTENT TO SEARCH ENGINES

(75) Inventors: Eliot Greenfield, Oakland, CA (US); Mark Anders, San Francisco, CA (US); Sho Kuwamoto, San Francisco, CA (US); Todd Rein, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 281 days.

(21) Appl. No.: 11/192,985

(22) Filed: Jul. 29, 2005

(51) Int. Cl.
*G06F 7/00* (2006.01)
*G06F 17/00* (2006.01)

(52) U.S. Cl. .............. 707/100; 707/1; 707/3; 707/104.1

(58) Field of Classification Search ........... 707/1, 707/3, 100, 104.1
See application file for complete search history.

(56) References Cited

U.S. PATENT DOCUMENTS

| | | | |
|---|---|---|---|
| 6,192,408 B1 | 2/2001 | Vahalia et al. | |
| 6,195,685 B1 | 2/2001 | Mukherjee et al. | |
| 6,564,246 B1 | 5/2003 | Varma et al. | |
| 7,234,133 B2 * | 6/2007 | Klein | 717/130 |
| 7,464,366 B2 | 12/2008 | Shukla et al. | |
| 2002/0069263 A1 * | 6/2002 | Sears et al. | 709/218 |
| 2002/0116354 A1 | 8/2002 | Baudu et al. | |
| 2003/0105755 A1 | 6/2003 | Daynes | |
| 2003/0105805 A1 | 6/2003 | Jorgenson | |
| 2004/0002944 A1 | 1/2004 | Hauser et al. | |
| 2004/0068494 A1 | 4/2004 | Tozawa et al. | |
| 2004/0068563 A1 | 4/2004 | Ahuja et al. | |
| 2004/0153504 A1 | 8/2004 | Hutchinson et al. | |
| 2004/0181579 A1 | 9/2004 | Huck et al. | |
| 2004/0237063 A1 * | 11/2004 | Klein | 717/101 |
| 2005/0038796 A1 * | 2/2005 | Carlson et al. | 707/100 |
| 2007/0006078 A1 | 1/2007 | Jewsbury et al. | |
| 2007/0226218 A1 | 9/2007 | Chatterjee et al. | |

OTHER PUBLICATIONS

Kramer, Doug; "How to Write Doc Comments for Javadoc" (Jan. 24, 2001 as dated by Internet Archive), http://web.archive.org/web/20010124043000/http://java.sun.com/j2se/javadoc/writingdoccomments/index.html.*

U.S. Appl. No. 11/194,118, filed Jul. 29, 2005, Sho Kuwamoto et al.

(Continued)

*Primary Examiner*—Tim T. Vo
*Assistant Examiner*—Garrett Smith
(74) *Attorney, Agent, or Firm*—Kilpatrick Stockton LLP

(57) ABSTRACT

Systems and methods which facilitate search engine discovery of and/or access to application program content are shown. Declarative code may be provided within the procedural code of a rich Internet application in order to identify various states, and their associated content, of the rich Internet application. A Web crawler may identify content associated with a rich Internet application using the foregoing information. Likewise, direct access to rich Internet application states associated with the identified content may be provided using the foregoing information. A translation module may be provided for interfacing between a Web crawler and a rich Internet application. Such a translation module may interact with the Web crawler to respond to Web crawler navigation instructions and access declarative code associated with different states of the rich Internet application, providing responsive information identifying content in a structure that is compatible with a search engine associated with the Web crawler.

16 Claims, 2 Drawing Sheets

OTHER PUBLICATIONS

Jeremy Allaire, "Macromedia Flash MX-A next-generation rich client," March 200, retrieved from http://download.macromedia.com/pub/flash/whitpapers/richclient.pdf on Jul. 2, 2009.

Office Action dated Jul. 7, 2009 in related U.S. Appl. No. 11/194,118.

U.S. Appl. No. 11/437,185, filed May 19, 2006.

Office Action dated Dec. 22, 2008 in related U.S. Appl. No. 11/437,185.

Office Action dated Apr. 1, 2009 in related U.S. Appl. No. 11/437,185.

Office Action dated May 28, 2009 in related U.S. Appl. No. 11/437,185.

Office Action dated Sep. 1, 2009 in related U.S. Appl. No. 11/437,185.

* cited by examiner

EXPOSING RICH INTERNET APPLICATION CONTENT TO SEARCH ENGINES

CROSS-REFERENCE TO RELATED APPLICATIONS

The present application is related to commonly assigned U.S. patent application Ser. No. 11/194,118 entitled "Systems and Methods for Specifying States Within Imperative Code," filed concurrently herewith, the disclosure of which is hereby incorporated herein by reference.

TECHNICAL FIELD

The present invention relates generally to computer programs and, more particularly, to exposing content available through a rich Internet application to search engine queries.

BACKGROUND OF THE INVENTION

The nearly ubiquitous adoption of computers has spawned a wide variety of application programs. The advent of the Internet and World Wide Web have resulted in the wide spread development of application programs operable upon various computing platforms. For example, browsers have been developed to execute or run upon various computing platforms, such as operating under control of the WINDOWS, UNIX, and MAC OS operating systems, to facilitate execution or running of Internet application programs. Such Internet application programs have often been developed using declarative code, such as using hypertext markup language (HTML) and extensible markup language (XML), in order to facilitate operation on various computing platforms, communication via the Internet, operation in server/client environments, et cetera. The aforementioned declarative code expressly defines application program objects, such as a Web page to be displayed by the Internet application program. For example, the document object model (DOM), a programming interface specification developed by the World Wide Web Consortium (W3C), allows a developer to create and modify HTML pages and XML documents as program objects.

The foregoing applications typically provide a structure in which each Web page comprises a relatively static display of content. Accordingly, the applications generally provide a regimented structure in which predefined documents are presented in response to user interaction.

The use of such application structure has its advantages. For example, the application program objects are easily accommodated by a browser interface and thus may readily be accessed by a variety of computing platforms. Moreover, the well defined structure of the application, with its readily identifiable navigation markers, facilitate discovery of content within the application by automated means. For example, Web crawlers, Web spiders, and other search engine information probes are application programs which continually or periodically automatically access Web pages to collect information regarding the content therein, such as to populate databases of an Internet search engine. One example of an Internet search engine employing automated Web crawling technology is the well known GOOGLE search engine provided by Google Inc. Mountain View, Calif. Because of the vast amount of information now available through the Internet, such search engines have become a primary means by which users are enabled to identify and access desired information. Thus the use of the tree structure and declarative language of the aforementioned application programs is advantageous in facilitating users finding and accessing the content thereof.

However, the use of such application structure is not without disadvantage. For example, the predefined documents present a constrained environment in which the user experience is primarily that of flipping pages, much like that of reading a book or magazine. Accordingly, rich applications, such as present a user with a fluid interface and dynamic operation, are not accommodated by the foregoing structure.

Rich Internet applications have been developed which present a user with an interface which is not constrained by the foregoing structure and thus deliver application front ends that combine desktop software functionality with the broad reach and low cost deployment of the Web. For example, FLEX, available from Macromedia, Inc., San Francisco, Calif., provides the aforementioned rich Internet applications.

Although providing an improved user experience, such rich Internet applications do not readily accommodate interaction with the aforementioned search engines and their associated Web crawlers. For example, rich Internet applications define a dynamic runtime environment defined by procedural code rather than a structure of static pages which are declaratively defined. Accordingly, a Web crawler is not well suited for discovering the content of such a rich Internet application. That is, search engines and their associated Web crawlers do not have the capability to process rich Internet application content in real time.

A Web crawler may parse through the rich Internet application code to identify textual information in order to obtain a sense of the content provided by the rich Internet application. However, such textual information only provides limited with respect to the content provided by the application. For example, the rich Internet application may interact with the user to access databases, et cetera, and thus the foregoing textual information might identify the types of databases interfaced, but would not have access to the content of the databases. Moreover, even where such textual information provides useful information, a search engine using this information is typically unable to facilitate a user directly accessing this information within the rich Internet application. The rich Internet application is typically entered at an initial point and the runtime environment of the application proceeds to present information dynamically. Thus the textual information identified by the Web crawler may not be directly accessible to a user via the search engine because the rich Internet application is to be entered through the initial point and the information arrived at through the dynamic runtime environment.

A prior attempt to make such rich Internet applications more compatible with the aforementioned search engine technologies has been to shadow a rich Internet application with a HTML version of the application. Such a technique suffers from the obvious disadvantage of requiring duplication of effort in coding the actual rich Internet application as well as the shadow HTML. Moreover, management of the application becomes problematic as changes in the rich Internet application must also be made to the shadow HTML, if that HTML code is to remain consistent with the rich Internet application. Some attempts have been made to simplify the developer's task in providing shadow HTML. For example, COLD FUSION, available from Macromedia, Inc., San Francisco, Calif., provides a feature in which static Web pages are generated out of dynamic content.

BRIEF SUMMARY OF THE INVENTION

The present invention is directed to systems and methods which facilitate search engine discovery of and/or access to application program content. According to embodiments of the invention, discoverable code, such as in the form of declarative code, is provided within the procedural or imperative code of a rich Internet application in order to identify content of the rich Internet application. Such discoverable code may additionally or alternatively identify different states within the dynamic runtime environment of the rich Internet application program. Accordingly, not only are Web crawlers or other automated means of content collection facilitated to identify content associated with a rich Internet application, but direct access to rich Internet application states associated with the identified content may be provided, such as through a search engine, according to embodiments of the invention.

According to embodiments of the invention, a developer annotates portions of the procedural code of a rich Internet application to facilitate exposing particular content to a search engine. Such annotations may comprise information describing the content to be identified by a Web crawler. Additionally or alternatively, such annotations may comprise a state name, or other identifier and/or information, facilitating direct, or semi-direct, access to the identified content.

Embodiments of the invention provide a translation module for interfacing between a Web crawler and a rich Internet application annotated according to an embodiment of the invention. For example, a translation module may interact with a Web crawler to respond to Web crawler navigation instructions and access declarative code associated with different states of a rich Internet application, providing responsive information identifying content in a structure that is compatible with a search engine associated with the Web crawler. According to embodiments of the invention, the structure of the content provided by the translation module comprises declaratory code, such as HTML page code or pseudo HTML page code.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
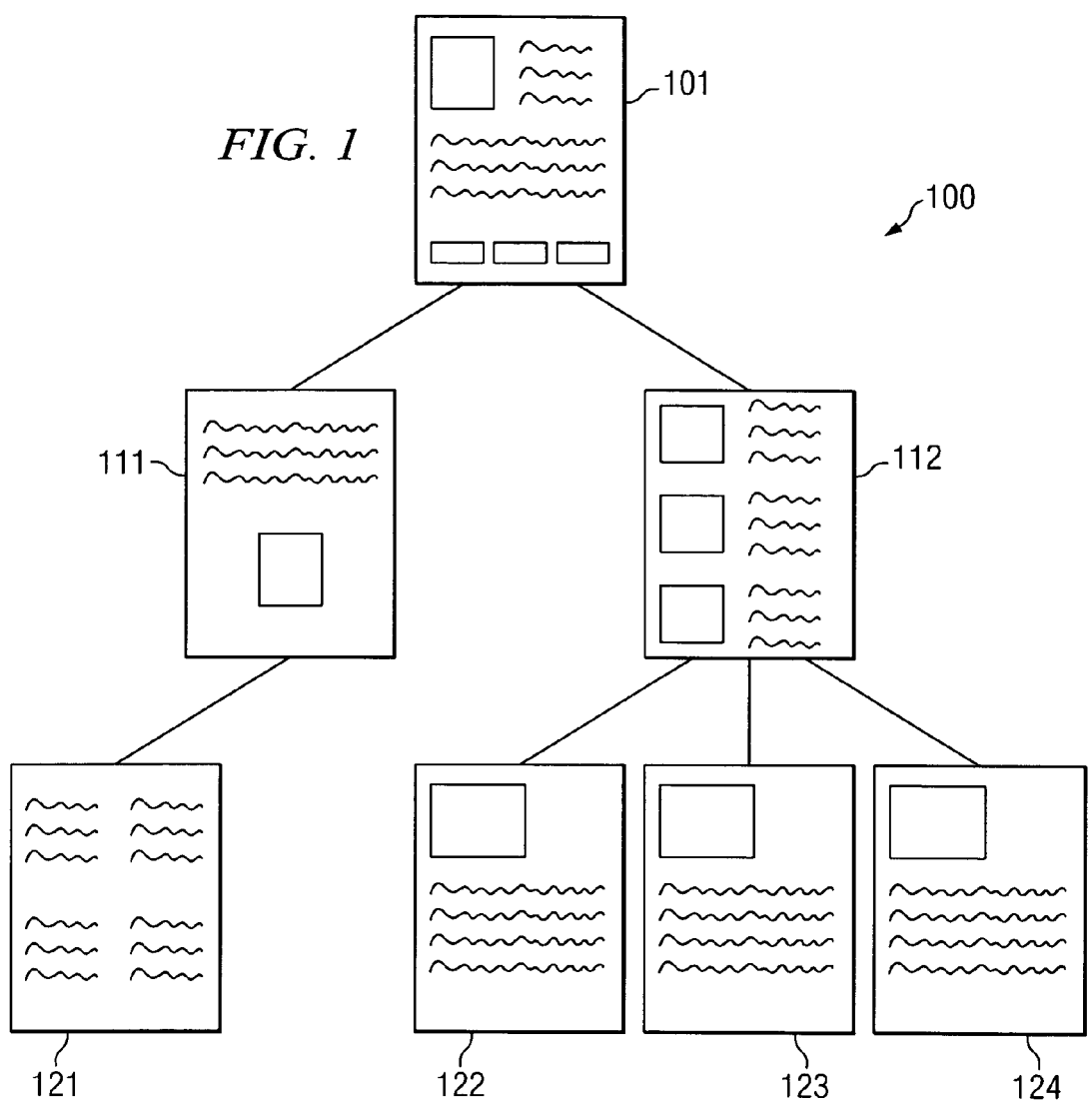
FIG. 1 shows an example of an Internet application employing declarative language.

Directing attention to FIG. 1, an example of an Internet application employing declarative language, such as HTML, to provide a tree type interface structure in which a user may navigate from page to page, is shown as application program 100. Application program 100 comprises Web pages 101-124, each of which provides a relatively static display of content. For example, Web page 101 may present a home page of a store from which a user may navigate to pages displaying various items for purchase. Web page 111, accessible from Web page 101, may identify items for purchase in a first category (in the illustrated example, a single item) and Web page 121, accessible from Web page 111, may provide detail with respect to the item of Web page 111. Similarly Web page 112, accessible from Web page 101, may identify items for purchase in a second category (in the illustrated example, three items) and Web pages 122-124, accessible from Web page 112, may provide detail with respect to respective ones of the items of Web page 112. It should be appreciated that, although a search feature may be provided within application program 100, such as to facilitate key word searching of an item and direct access to a respective one of Web pages 121-124, the structure of application program 100 is nevertheless available for independent discovery of each of these Web pages.

The foregoing structure and declarative code of the Web pages is well suited for discovery of content by a Web crawler. Accordingly, a search engine such as GOOGLE may be apprised of the content associated with each of Web pages 101-124 and, thus, a user may readily identify and access content of application program 100. However, the structure of application program 100 presents a constrained environment in which the user experience is primarily that of flipping pages, and does not present a user with a fluid interface and dynamic operation like that of a desktop application or a rich Internet application.

Figure 2:
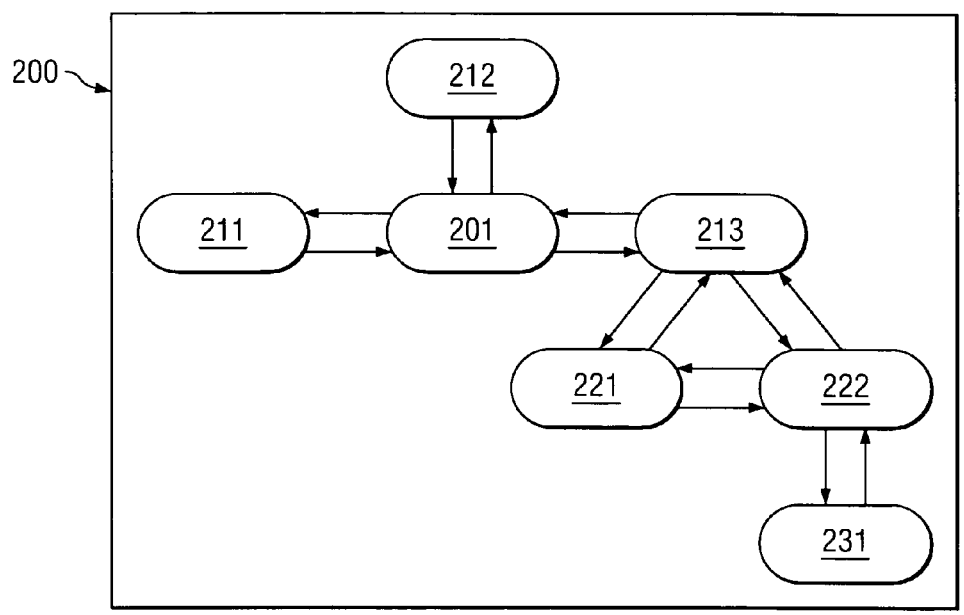
FIG. 2 shows an application program having states defined therein according to an embodiment of the invention.

Referring now to FIG. 2, an exemplary rich Internet application providing robust and dynamic operation is illustrated as application program 200. Applicant program 200 is preferably provided using procedural and/or imperative code, such as that associated with an application developed using FLEX BUILDER, available from Macromedia, San Francisco, Calif. Accordingly, application program 200 operates in runtime to dynamically flow and morph through various states, such as in response to user input or other interaction. However, these various states of application program 200 are generally not clearly demarcated independently accessible objects, as are the Web pages of application program 100. Accordingly, even if a Web crawler were able to access the code of application program 200 and identify textual information therein, the Web crawler will not typically be able to identify various states of application program 200 associated with particular content. Moreover, a search engine will typically be unable to provide a user meaningful access to any point of application program 200 except an initial point.

According to an embodiment of the present invention, discoverable information, such as in the form of declarative language, is added to the procedural code of application program 200 to facilitate identification of content for use by a search engine and/or to provide direct or semi-direct access to a state of application program 200 associated with particular content. As used herein, discoverable information comprises information from which a computer or other means is facilitated to derive or arrive at desired information. Declarative code, is an example of one embodiment of discoverable information in which code expressly describes what something is (e.g., a blue button in particular page of a user interface) as opposed to how something is to be done (e.g., imperative code giving instructions to a computer to create a button in a user interface and then instructing the computer to make the button blue).

In accordance with an embodiment of the invention, a developer identifies various states of application program 200, such as states 201-231, and causes declarative language to be inserted within the procedural code of application program 200 to identify these states. Such declarative language may include a name of the state, such as may be useful in providing a uniform resource locator (URL) for directly accessing the state, a description of the state, such as may be useful to a human and/or automated accessing means in understanding the state, its context, and/or the content associated therewith, and/or the like according to embodiments of the invention.

Figure 3:
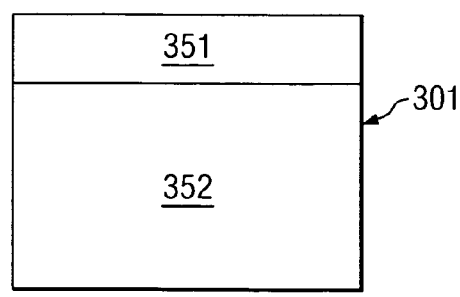
FIG. 3 shows a high level block diagram of declarative language as may be inserted within the procedural code of the application program of FIG. 2 according to an embodiment of the invention.

Directing attention to FIG. 3, a high level block diagram of declarative language as may be inserted within the procedural code of application program 200 is shown as declarative language 301. Declarative language 301 of embodiments of the present invention may be disposed at any point in the procedural code determined useful for identifying states by a developer. Accordingly, different ones of declarative language 301 will be disposed at selected points within the procedural code of application program 200 in association with particular states and/or content to be identified. Declarative language 301 of the illustrated embodiment includes state identification 351 and state description 352. State identifier 351 may comprise a state name, such as in the form of <state name="start">. State description 352 may comprise a description of how to construct the state, such as in the form of <add Children target="application">, <panel>, <button label="products">, <button label="services">, </add Children>, or <property Override target="main Panel" property="visible" value="false"/> et cetera, and content associated with the state, such as in the form of <content=Company Name, Company Address, Product Brand 1, Product Brand 2. These can be combined to create a description of the state, such as in the form of CompanyName.com/ProductDatabase/chooser, mxml#productDetail?televisions. Additional detail with respect to embodiments of declarative language inserted into procedural code for identifying states and associated content is provided in the above referenced patent application entitled "Systems and Methods for Specifying States Within Procedural Code."

Figure 4:
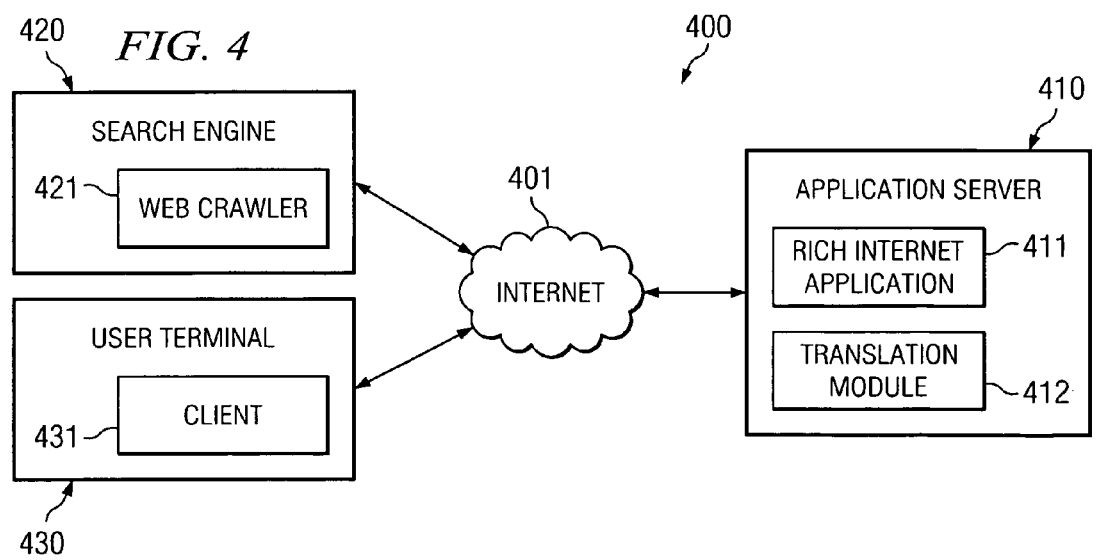
FIG. 4 shows a system adapted to utilize declarative language provided within procedural code to expose application program content to a search engine according to an embodiment of the invention.

Directing attention to FIG. 4, a system adapted to utilize declarative language, such as that described above, provided within procedural code to expose rich Internet application content to a search engine is shown as system 400. In the illustrated embodiment of system 400, user terminal 430, search engine 420, and application server 410 are interconnected via network 401.

Application server 410 includes rich Internet application 411, such as may comprise a FLEX application. User terminal 430 includes client 431, which may comprise a Web browser such as INTERNET EXPLORER, available from Microsoft Corporation, Redmond, Wash., or NETSCAPE, available from Netscape Communications Corporation, Mountain View, Calif. Accordingly, user terminal 430 may interact with application server 410, via network 401, to execute rich Internet application 411, such as by downloading all or portions (e.g., applets) of rich Internet application 411 for runtime execution, by client 431, as is well known in the art.

Search engine 420 includes Web crawler 421 operable to automatically communicate with various systems coupled to network 401 and identify content provided thereby to search engine 420, as is well known in the art. User terminal 430 may interact with search engine 420 using client 431, via network 401, to identify particular content of interest to a user thereof, also as is well known in the art. However, system 400 has been adapted to facilitate search engine 420 identifying content within rich Internet applications, such as rich Internet application 411, or other applications provided in procedural code and for facilitating direct or semi-direct links to such content. Accordingly, a user of user terminal 430 may have initially directed client 431 to search engine 420 to conduct a keyword search for particular content, thereafter being directed to a particular state of rich Internet application 411 associated with the content by search engine 420.

To facilitate the foregoing, rich Internet application 411 of the illustrated embodiment includes declarative language to identify states and associated content, as described above. Moreover, application server 410 of the illustrated embodiment includes translation module 410 to provide interfacing between Web crawler 421 and a rich Internet application 411. In operation according to a preferred embodiment, when Web crawler 421 accesses application server 410 to discover content available within rich Internet application 411, application server 410 invokes translation module 412 to provide appropriate information to Web crawler 421. Application server 410 may recognize that the requested access to rich Internet application 411 is coming from a Web crawler, or other application program which automatically accesses Web pages to collect information regarding the content therein, through the access protocols, through the way in which the rich Internet application is being interacted with, through the Internet protocol (IP) address of the access requests, through a standardized convention adopted by Web crawlers, et cetera.

Translation module 412 of embodiments interacts with Web crawler 421 to respond to Web crawler navigation instructions and access declarative code associated with different states of a rich Internet application, providing responsive information identifying content in a structure that is compatible with a search engine associated with Web crawler 421. According to embodiments of the invention, the structure of the content provided by translation module 412 to Web crawler 421 comprises declaratory code, such as HTML page code or pseudo HTML page code. For example, translation module 412 load rich Internet application 411 for runtime execution at application server 410 and may traverse various states, such as states 201-231 of FIG. 2, of rich Internet application 411 in response to interaction with Web crawler 421. As various states are reached, translation module 412 may generate declaratory code, such as an HTML page, representing the state and serve that code up to Web crawler 421.

It should be appreciated that the declarative code served up by translation module 412 need not be a complete description of the state, such as may include colors, textures, images, et cetera which provide "eye wash" to a user, but rather may include a description of the aspects of the state important to Web crawler 421 and/or search engine 420, such as content and identifying URL. Accordingly, the declarative code served up by translation module 412 may comprise pseudo HTML page code providing a description of the state which omits description of aspects of the state which are not useful to Web crawler 421 and/or search engine 420. Such pseudo declaratory code may be utilized in order to lessen the processing burden on translation module 412 and/or application server 410 in serving declaratory code to Web crawler 421. However, it should be appreciated that if a user were to access the pseudo declaratory code served up by translation module 412, such as through "cached pages" of search engine 420, a poorly formatted and quite likely partially humanly readable page would be presented. Although this is expected to be of no or little consequence in most circumstances, it is within the scope of the invention to serve up declaratory code using translation module 412 which fully or very nearly fully describes the state of rich Internet application 411, if desired.

When a user accesses search engine 420 according to an embodiment of the invention, the user is not only enabled to identify rich Internet application 411 as including content of interest, but is facilitated to directly or semi-directly access a state of rich Internet application 411 associated with the desired content. For example, a URL identifying application server 410, rich Internet application 411, and a particular state of rich Internet application 411 associated with the desired content may be provided by search engine 420 to client 431, as may have been provided by translation module 412 to Web crawler 421. Such a URL may be in the form of AplicationServer.com/RichInternetApplication/?statename=StateName (where the foregoing capitalized terms are replaced with specific information). When client 431 accesses rich Internet application 411 using such a URL, application server 410 preferably serves up rich Internet application 411, or appropriate portions thereof, to client 431 and instructs client 431 to execute rich Internet application 411 to the point of the identified state, according to embodiments of the invention.

It should be appreciated that direct navigation to the identified state may be prevented in particular circumstances, such as where conditions precedent are to be met. For example, a user may be required to login prior to accessing a particular state of rich Internet application 411. Similarly, information such as a product being purchased, may be required prior to accessing a checkout state of rich Internet application 411. Accordingly, semi-direct access to an identified state, e.g., via a login state, a product selection state, et cetera, may be provided in order to meet particular conditions precedent.

In operation according to embodiments of the invention, runtime operation of rich Internet application 411 providing direct navigation to a selected state uses procedural code identifying a closest base state and implementing the base state and any state deltas or differences associated with a selected state. Such implementation of states and deltas is preferably accomplished in a "hidden" mode, such that a user is not aware of various states which may be traversed. Moreover, such implementation preferably takes a "shortest route" to arrive at a selected state, and thus will not necessarily traverse all states a user may have originally traversed to arrive at the selected state when using the application program. Additional detail with respect to traversing states of an application program to arrive at a desired state is provided in the above referenced patent application entitled "Systems and Methods for Specifying States Within Procedural Code."

It should be appreciated from the above that application server 400 of the illustrated embodiment provides a runtime environment for rich Internet application 411 such that translation module 412 interacts with Web crawler 421 to traverse various states of rich Internet application 411 and to serve up declaratory code in a form expected by Web crawler 421. Moreover, client 431 of the illustrated embodiment provides a runtime environment for rich Internet application 411 such that when client 431 is directed to a particular state of rich Internet application 411, the application is executed, preferably in a hidden mode, to traverse any intervening states and arrive at the particular state.

Although embodiments have been described herein with reference to Internet search engines, it should be appreciated that the concepts of the present invention are not limited to use with respect to the Internet or search engines. For example, application programs to which the concepts of the present invention are applied may be accessible via any form of network, such as intranet, extranet, personal area network (PAN), local area network (LAN), metropolitan area network (MAN), wide area network (WAN), cable transmission system, satellite communication system, wireless network, the public switched telephone network (PSTN), and/or the like. Alternatively, application programs to which the concepts of the present invention are applied may be directly accessible to a user terminal and/or search engine, such as where host systems for such functions are consolidated on a single host. Moreover, various means of content collection, indexing, and/or access, in addition to the above described user terminal, search engine, and application server, may employ concepts of the present invention.

It should be appreciated that the concepts of the present invention are not limited to use with rich Internet applications. Accordingly, embodiments of the invention may be utilized with respect to a variety of application programs implementing procedural code.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer program product including a computer readable storage medium having computer executable code thereon, said computer readable storage medium comprising:
   an application program written in non-declarative code,
      wherein execution of said application program non-declarative code defines a plurality of runtime states,
      wherein portions of the application program comprise a plurality of declarative language code segments, wherein, for each of multiple runtime states of the plurality of runtime states, one or more of the declarative language code segments:
      identify the runtime state of said plurality;
      provide information with respect to content associated with the runtime state; and provide information facilitating a link to the runtime state; and a translation module operable in response to a search engine information probe:
- to cause said application program to enter the multiple states of said plurality of runtime states,
- to select a portion of procedural code within said application program, wherein said selected portion of procedural code defines a selected runtime state
- to access said selected portion of procedural code,
- to read non-procedural annotations inserted within said selected portion of procedural code; and
- to generate one or more declarative language code segments compatible with said search engine information probe query based on said non-procedural annotations,
- wherein said selected one or more runtime states are selected according to one or more requests for said content by said search engine information probe.

2. The computer program product of claim 1, wherein said application program comprises a rich Internet application.

3. The computer program product of claim 1, wherein said plurality of declarative language code segments comprise annotations to an imperative code of said application program.

4. The computer program product of claim 1, wherein said declarative language code segments provided to said search engine information probe by said translation module are provided in a different format declarative language code than utilized with respect to said declarative language code segments.

5. The computer program product of claim 4, wherein said different format comprises a hypertext markup language.

6. The computer program product of claim 1, wherein said translation module generates descriptions of said selected one or more runtime states, said descriptions including said information with respect to said content associated with said selected one or more runtime states.

7. The computer program product of claim 1, wherein said search engine information probe comprises a Web crawler.

8. The computer program product of claim 1, wherein said application program comprises a Web enabled application program operable in an Internet browser.

9. A computer implemented method comprising:
selecting a runtime state from a plurality of runtime states, wherein the plurality of runtime states are produced during execution of an application program;
receiving a search engine information probe query from a search engine requesting information related to content of said application program, wherein said content is associated with said selected runtime state;
in response to said search engine information probe query, executing said application program to achieve said selected runtime state;
based on said executing of said application program, selecting a portion of procedural code within said application program, wherein said selected portion of procedural code defines said selected runtime state;
accessing said selected portion of procedural code;
reading, by a processor, non-procedural annotations inserted within said selected portion of procedural code, wherein said non-procedural annotations:
describe a content of said selected runtime state; and
provide information facilitating a link to said selected runtime state;
generating, by a processor, declarative programming language code segments compatible with said search engine information probe query based on said non-procedural annotations; and
transmitting said generated declarative programming language code segments to a search engine information probe in response to said search engine information probe query.

10. The computer implemented method of claim 9 wherein said content comprise one or more of: a state name; and a description of an output of said selected runtime state.

11. The computer implemented method of claim 9, wherein said executing said application program comprises: executing said application program upon an application server that serves said application program to user terminal clients.

12. The computer implemented method of claim 9, wherein said generating said declarative programming language code segments comprises: omitting a description of aspects of said selected runtime state of said application program that are incompatible with said search engine.

13. The computer implemented method of claim 9, wherein said search engine information probe comprises a Web crawler.

14. A computer program product including a computer readable medium having computer executable code thereon, when executed by a processor performs the method comprising:
selecting a runtime state from a plurality of runtime states, wherein the plurality of runtime states are produced during execution of an application program;
receiving a search engine information probe query from a search engine requesting information related to content of said application program, wherein said content is associated with said selected runtime state;
in response to said search engine information probe query, executing said application program to achieve said selected runtime state;
based on said executing of said application program, selecting a portion of procedural code within said application program, wherein said selected portion of procedural code defines said selected runtime state;
accessing said selected portion of procedural code;
reading, by a processor, non-procedural annotations inserted within said selected portion of procedural code, wherein said non-procedural annotations:
describe a content of said selected runtime state; and
provide information facilitating a link to said selected runtime state;
generating, by a processor, declarative programming language code segments compatible with said search engine information probe query based on said non-procedural annotations; and
transmitting said generated declarative programming language code segments to a search engine information probe in response to said search engine information probe query.

15. The computer program product of claim 14, wherein said declarative language code segments comprise annotations to an imperative code of said application program.

16. The computer program product of claim 14, wherein said application program comprises a Web enabled application program operable in an Internet browser.

* * * * *